(12) United States Patent
Bickler et al.

(10) Patent No.: US 8,745,117 B2
(45) Date of Patent: Jun. 3, 2014

(54) ARITHMETIC LOGIC UNIT FOR USE WITHIN A FLIGHT CONTROL SYSTEM

(71) Applicant: Honeywell International Inc., Morristown, NJ (US)

(72) Inventors: Jason Bickler, Phoenix, AZ (US); Karen Brack, La Jolla, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/065,636

(22) Filed: Oct. 29, 2013

(65) Prior Publication Data

US 2014/0046991 A1 Feb. 13, 2014

Related U.S. Application Data

(62) Division of application No. 12/509,121, filed on Jul. 24, 2009, now Pat. No. 8,615,540.

(51) Int. Cl.
*G06F 7/38* (2006.01)
*G06F 7/00* (2006.01)

(52) U.S. Cl.
USPC ........... 708/490; 710/2; 710/5; 710/8; 710/15

(58) Field of Classification Search
None
See application file for complete search history.

(56) References Cited

U.S. PATENT DOCUMENTS

| | | | |
|---|---|---|---|
| 4,418,383 A | 11/1983 | Doyle et al. | |
| 4,514,825 A | 4/1985 | Nordling | |
| 4,525,797 A | 6/1985 | Holden | |
| 4,573,137 A | 2/1986 | Ohhashi | |
| 4,748,584 A | 5/1988 | Noda | |
| 4,807,175 A | 2/1989 | Tokumaru et al. | |
| 5,018,093 A | 5/1991 | Shih | |
| 5,226,003 A | 7/1993 | Nagamatsu | |
| 5,235,536 A | 8/1993 | Matsubishi et al. | |
| 5,272,662 A | 12/1993 | Scriber et al. | |
| 5,325,399 A | 6/1994 | Haspeslagh et al. | |
| 5,377,122 A | 12/1994 | Werner et al. | |
| 5,444,647 A | 8/1995 | Komoda | |
| 5,450,607 A | 9/1995 | Kowalczyk et al. | |
| 5,457,805 A | 10/1995 | Nakamura | |
| 5,500,812 A | 3/1996 | Saishi et al. | |
| 5,638,383 A | 6/1997 | Wotzak et al. | |
| 5,841,663 A | 11/1998 | Sharma et al. | |
| 5,848,285 A | 12/1998 | Kapusta et al. | |
| 5,892,699 A | 4/1999 | Duncan et al. | |
| 5,969,975 A | 10/1999 | Glass et al. | |
| 6,370,635 B2 | 4/2002 | Snyder | |
| 6,609,189 B1 | 8/2003 | Kuszmaul et al. | |
| 6,629,119 B1 | 9/2003 | Chen et al. | |

(Continued)

OTHER PUBLICATIONS

EP Office Action for application No. 10 170 206.6, dated Feb. 18, 2013.

(Continued)

*Primary Examiner* — Scott Sun
(74) *Attorney, Agent, or Firm* — Ingrassia Fisher & Lorenz, P.C.

(57) ABSTRACT

An arithmetic logic unit (ALU) for use within a flight control system is provided. The ALU comprises a first register configured to receive a first operand, a second register configured to receive a second operand, and an adder coupled to the first register and the second register. The adder is configured to generate a sum of the first operand and the second operand and to generate intermediate sums that are used to determine a product of the first operand and the second operand.

7 Claims, 1 Drawing Sheet

(56) References Cited

U.S. PATENT DOCUMENTS

| | | |
|---|---|---|
| 6,922,716 B2 | 7/2005 | Desai et al. |
| 7,330,869 B2 | 2/2008 | Skull |
| 7,401,333 B2 | 7/2008 | Vandeweerd |
| 7,480,690 B2 | 1/2009 | Simkins et al. |
| 7,493,470 B1 | 2/2009 | Cumplido et al. |
| 2002/0063577 A1 | 5/2002 | Abbott |
| 2005/0004963 A1 | 1/2005 | Guo et al. |
| 2005/0027773 A1 | 2/2005 | Machnicki et al. |
| 2005/0080834 A1 | 4/2005 | Belluomini et al. |
| 2005/0134308 A1 | 6/2005 | Okada et al. |
| 2006/0277247 A1 | 12/2006 | Skull |

OTHER PUBLICATIONS

EP Search Report, EP 10170206.6-1229/2282261 dated May 23, 2011.
EP Communication, EP 10170206.6-1229 dated Jun. 15, 2011.
Zhang, Li et al.; A Research on an ASIP Processing Element Architecture Suitable for FPGA Implementation; 2008 International Conference on Computer Science and Software Engineering, Dec. 12, 2008, pp. 441-445, XP031377497.

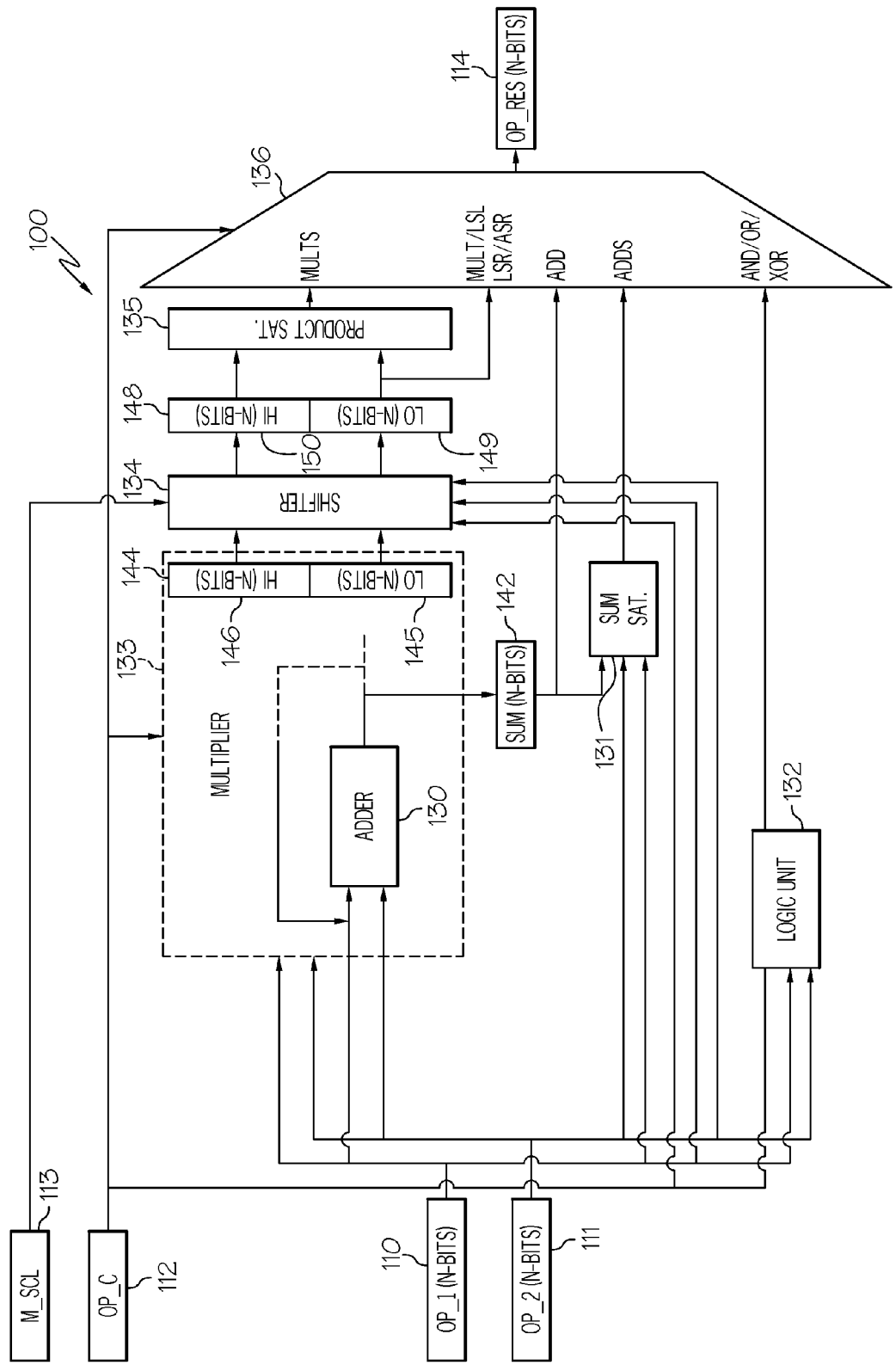

ARITHMETIC LOGIC UNIT FOR USE WITHIN A FLIGHT CONTROL SYSTEM

RELATED APPLICATIONS

This application is a divisional application of co-owned, U.S. patent application Ser. No. 12/509,121, filed on Jul. 24, 2009 to Jason Bickler, now issued as U.S. Pat. No. 8,615,540, and is incorporated by reference herein in its entirety.

TECHNICAL FIELD

The subject matter herein generally relates to flight control systems and, more particularly, relates to an arithmetic logic unit for use within a flight control system.

BACKGROUND

Modern flight control systems are required by Federal Air Regulations to provide safe and reliable control of an aircraft. Any failure condition that prevents continued safe flight and landing must be extremely improbable. In the past, flight control systems were implemented using discrete analog components. The use of such analog components enabled system designers to develop flight control systems that could be fully tested and analyzed in order to certify their conformance with the safety requirements of the Federal Air Regulations relatively quickly and inexpensively.

More recently, flight control systems have been developed using digital components, such as arithmetic logic units (ALUs) and other digital processing units. These digital flight control systems provide increased performance and take up less space and weight on the aircraft. However, it has generally been found that the hardware and software of these systems is of such complexity that they cannot be fully tested and analyzed without significant expense and difficulty. In addition, it is not feasible to use commercially available digital components within a flight control system because they are not generally tested and analyzed at the level required by the Federal Air Regulations. Further, the structural implementation of commercially available digital components may not be known and, consequently, there is no way to validate their conformance with the safety requirements of the Federal Air Regulations.

Accordingly, it is desirable to provide an ALU for use within flight control system that is fully testable and analyzable. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, an ALU is provided for use within a flight control system. The ALU comprises a first register configured to receive a first operand, a second register configured to receive a second operand, and an adder coupled to the first register and the second register. The adder is configured to generate a sum of the first operand and the second operand and to generate intermediate sums that are used to determine a product of the first operand and the second operand.

In another embodiment, a method is provided for testing a functional unit within an ALU of a flight control system. The functional unit has a predetermined structural implementation and is configured to generate a result based on at least one data input. The method comprises generating a plurality of test vectors based on the predetermined structural implementation of the functional unit, each test vector comprising a test value for each data input into the functional unit and an expected value. Further, for each one of the plurality of test vectors, the method comprises providing each test value to the functional unit and verifying that the expected result is generated.

BRIEF DESCRIPTION OF THE DRAWINGS

The present invention will hereinafter be described in conjunction with the following drawing FIGURE, wherein like numerals denote like elements, and FIG. 1 is a functional block diagram of an exemplary ALU for use within a flight control application.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Although the diagram shown herein depicts example arrangements of elements, additional intervening elements, devices, features, or components may be present in an actual embodiment.

FIG. 1 is a functional block diagram of an exemplary ALU 100 for use within a flight control system. ALU 100 includes a first operand register 110 for storing first operand (OP_1), a second operand register 111 for storing a second operand (OP_2), an operation code register 112 for storing an operation code (OP_C), scale factor register 113 for storing a multiplication scale factor (M_SCL). As further discussed below, ALU 100 performs arithmetic and logic operations on OP_1 and OP_2 and generates an operation result (OP_RES) that is stored in an operation result register 114. OP_1 and OP_2 are N-bit two's complement numbers, wherein N is a positive integer greater than or equal to one.

In one embodiment, ALU 100 is implemented within, or coupled to, a math sequencer that executes sequences of arithmetic and logic operations, such as addition operations (ADD or ADDS), bitwise logic operations (AND, OR, XOR, etc.), multiplication operations (MULT or MULTS), and bitwise shifts. In this case, the math sequencer fetches the values of OP_1, OP_2, OP_C, and M_SCL from a stored location and provides those values to first operand register 110, second operand register 111, operation code register 112, and scale factor register 113, respectively. The math sequencer may also be configured to retrieve the OP_RES value from operation result register 114 when the appropriate number of clock cycles has elapsed. ALU 100 may be realized as a programmable logic device (PLD), an application specific integrated circuit (ASIC), a processor (shared, dedicated, or group) and memory that execute one or more software or firmware programs, a combinational logic circuit, and/or other suitable components or combinations thereof.

ALU 100 includes a plurality of functional units, such as an adder 130, a sum saturator 131, a logic unit 132, a multiplier 133, a shifter 134, and a product saturator 135. In addition, ALU 100 also includes a multiplexer 136 for selecting the appropriate operation result based on the value of OP_C. As further discussed below, the architecture of each functional unit 130-135 is defined at a low-level during the design and development of ALU 100. Consequently, each functional unit 130-135 has a predetermined structural implementation.

Adder 130 determines the N-bit sum of OP_1 and OP_2. In the depicted embodiment, adder 130 is coupled to receive OP_1 and OP_2 from first and second operand registers 110, 111, respectively. In this case, adder 130 generates the N-bit sum of OP_1 and OP_2 and stores the sum in adder register 142. Adder register 142 may be formed integrally with adder 130 or it may be a separate component of ALU 100. In one embodiment, adder 130 comprises a carry select adder for determining the sum of two N-bit two's complement numbers. However, it will be understood by one skilled in the art that alternative embodiments may utilize other adder architectures.

Sum saturator 131 detects underflows and overflows in the N-bit sum of OP_1 and OP_2 from adder register 142 and generates a saturated sum. In the case of an underflow, the saturated sum is the minimum value that can be represented by an N-bit two's complement number (e.g., 0x8000 for a 16-bit two's complement number). In the case of an overflow, the saturated sum is the maximum value that can be represented by an N-bit two's complement number (e.g., 0x7FFF for a 16-bit two's complement number). Alternatively, if sum saturator 131 does not detect an underflow or an overflow, the saturated sum is assigned the value of the N-bit sum.

In the depicted embodiment, sum saturator 131 is coupled to receive OP_1, OP_2, and the sum of OP_1 and OP_2 from first operand register 110, second operand register 111, and adder register 142, respectively. In this case, sum saturator 131 generates the saturated sum based on the most significant bits (MSBs) of OP_1, OP_2, and the sum. For example, when the MSBs of OP_1 and OP_2 are both "1" and the MSB of the sum is "0", sum saturator 131 detects an underflow and the saturated sum is the minimum value. Further, when the MSBs of OP_1 and OP_2 are both "0" and the MSB of the sum is "1", sum saturator 131 detects an overflow and the saturated sum is the maximum value. Alternatively, the saturated sum is assigned the value of the sum that is stored in adder register 142. The saturated sum is stored in operation result register 114 when the value of OP_C corresponds to a ADDS operation.

Logic unit 132 performs logic operations (e.g., AND, OR, XOR, etc.) on OP_1 and OP_2. In the depicted embodiment, logic unit 132 is coupled to receive OP_1, OP_2, and OP_C from first operand register 110, second operand register 111, and operation code register 112, respectively, and generates a result that is stored in operation result register 114. If the value of OP_C corresponds to an AND operation, the generated result is the N-bit bitwise AND of OP_1 and OP_2. Alternatively, if the value of OP_C corresponds to an OR operation, the generated result is the N-bit bitwise OR of OP_1 and OP_2. Other bitwise logic operations may be processed by logic unit 132 in a substantially similar manner.

Multiplier 133 determines the product of OP_1 and OP_2. In the depicted embodiment, multiplier 133 is coupled to receive OP_1 and OP_2 from first and second operand registers 110, 111, respectively, and is configured to generate a (N*2)-bit product that is stored in a multiplier register 144. Multiplier 133 utilizes adder 130 to generate intermediate sums (e.g., sums of partial products and other values) that are used to determine the product of OP_1 and OP_2. In one embodiment, multiplier 133 comprises an implementation of the Booth technique for multiplying two's complement binary numbers. However, it will be appreciated that alternative embodiments of ALU 100 may utilize other techniques for performing binary multiplication.

Multiplier register 144 may be formed integrally with multiplier 133 or it may be a separate component. In the depicted embodiment, multiplier register 144 comprises an N-bit product-low register 145 that receives the lower-half of the (N*2)-bit product and an N-bit product-high register 146 that receives the upper-half of the (N*2)-bit product. Registers 145 and 146 may comprise shift registers for receiving and shifting intermediate values during the multiplication operation. Alternatively, multiplier register 144 may comprise a single (N*2)-bit register.

Shifter 134 generates an N-bit shift-result by performing bitwise shifts (logical and arithmetic) on OP_1 and/or OP_2. In addition, shifter 134 may also generate a (N*2)-bit scaled product of OP_1 and OP_2. In the depicted embodiment, shifter 134 is coupled to receive OP_1 from first operand register 110, OP_2 from second operand register 111, OP_C from operation code register 112, M_SCL from scale factor register 113, and the product from multiplier register 144. If the value of OP_C corresponds to a shift (e.g., a logical shift left (LSL), logical shift right (LSR), arithmetic shift right (ASR), etc.), shifter 134 performs the appropriate shift and stores the shift-result in a shifter register 148. Shifter 134 may be configured to shift the value of OP_1 by the number of bits identified in OP_2 (or a portion of OP_2) or to shift the value of OP_2 by the number of bits identified by OP_1 (or a portion of OP_1).

If the value of OP_C corresponds to a multiplication operation (MULT or MULTS), shifter 134 generates a scaled product. In one embodiment, shifter 134 generates the scaled product by shifting the (N*2)-bit product to the right by the number of bits identified by M_SCL. The scaled product is stored in shifter register 148.

Shifter register 148 may be formed integrally with shifter 134 or it may be a separate component. In the depicted embodiment, shifter register 148 includes an N-bit shift-low register 149 and an N-bit shift-high register 150. In the case of a bitwise shift, shifter 134 stores the N-bit shift-result in the shift-low register 149. In the case of a scaled product, shifter 134 stores the lower half of the (N*2)-bit scaled product in shift-low register 149 and the upper half of the (N*2)-bit scaled product in shift-high register 150. Alternatively, shifter register 148 may comprise a single (N*2)-bit register.

Product saturator 135 detects underflows and overflows in the scaled product and generates an N-bit saturated product. In the depicted embodiment, product saturator 135 is coupled to receive the scaled product from shifter register 148. If product saturator 135 detects an underflow, is the minimum value that can be represented by an N-bit two's complement number. If the product saturator 135 detects an overflow, the saturated product is the maximum value that can be represented by an N-bit two's complement number. Alternatively, if product saturator 135 does not detect an underflow or an overflow, the saturated product is the lowest N-bits of the multiplier register 144. As described below, the saturated product is stored in operation result register when the value of OP_C corresponds to a MULTS operation.

Multiplexer 136 is coupled to operation code register 112, adder register 142, sum saturator 131, logic unit 132, shifter register 148, and product saturator 135 and is configured to select the appropriate operation result (OP_RES) based on the value of OP_C. In the depicted embodiment, multiplexer 136 selects the sum from adder register 142 when the value of OP_C corresponds to an ADD operation, the saturated sum from sum saturator 131 when the value of OP_C corresponds to an ADDS operation, and the logic-result from logic unit 132 when the value of OP_C corresponds to a logic operation (e.g., AND, OR, XOR, etc.). Further, multiplexer 136 selects the lowest N-bits from shifter register 148 when the value of OP_C corresponds to a MULT operation or a shift (e.g., LSL, LSR, AND ASR) and the saturated product from product saturator 135 when the value of OP_C corresponds to a MULTS operation. The OP_RES value selected by multiplexer 136 is stored in the operation result register 114.

ALU 100 includes various attributes that allow it to be fully tested and analyzed. As noted above, the architecture of functional units 130-135 is defined at a low-level (e.g., the Register Transfer Level (RTL) or the gate-level) in order to achieve a predetermined structural implementation. For example, a hardware description language (HDL) and/or Electronic Design Automation (EDA) tool may be utilized to generate a low-level description of ALU 100. In this case, rather than invoking an adder architecture provided by a software library within the HDL or EDA environment, a low-level (e.g., RTL or gate-level) description of adder 130 is generated in order to achieve a predetermined structural implementation during synthesis.

The predetermined structural implementation of each functional unit 130-135 may be analyzed to identify targeted test vectors that test each one of its components and verify that it generates correct results. For example, the structural implementation of adder 130 may be analyzed to identify a plurality of adder test vectors, each including test values for the data inputs to adder 130 (e.g., OP_1 and OP_2) and an expected sum. These adder test vectors are targeted, based on the architecture of adder 130, to fully test and analyze adder 130.

A substantially similar approach may be utilized to generated test vectors for analyzing the other functional units 131-135. For example, a plurality of sum saturator test vectors, each comprising test values for the data inputs to sum saturator 131 (e.g., OP_1, OP_2, and the sum of OP_1 and OP_2) and an expected saturated sum, may be generated based on the predetermined structural implementation of sum saturator 131. Further, a plurality of multiplier test vectors, each comprising test values for the data inputs to multiplier 133 (e.g., OP_1 and OP_2) and an expected product, may be generated based on the predetermined structural implementation of multiplier 133. Further still, a plurality of shifter test vectors, each comprising test values for the data inputs to shifter 134 (e.g., OP_1 and OP_2) and an expected shift-result, may be generated based on the predetermined structural implementation of shifter 134 and a plurality of product saturator test vectors, each comprising test values of the data inputs to product saturator 135 (e.g., a (N*2)-bit scaled product) and an expected saturated product, may be generated based on the predetermined structural implementation of product saturator 135.

In addition, the data inputs to, and data outputs from, each functional unit 130-135 are directly accessible. As noted above, each functional unit 130-135 receives data from one or more input registers and generates a result that is stored in one or more output registers. These registers may be utilized to independently test and analyze each functional unit 130-135 using the test vectors described above. Accordingly, adder 130 may be tested by inputting the test values from each adder test vector into first and second operand registers 110, 111 and verifying that the expected sum is stored in adder register 142. Sum saturator 131 may be tested by inputting the test values for each sum saturator test vector into first and second operand registers 110, 111 and adder register 142 and verifying that the expected saturated sum is stored in operation result register 114 when the value of OP_C corresponds to an ADDS operation. Further, multiplier 133 may be tested by inputting the test values for each multiplier test vector into first and second operand registers 110, 111 and verifying that the expected product is stored in product register 144. Further still, shifter 134 may be tested by inputting the test values for each shifter test vector into first and second operand registers 110, 111 and verifying that the expected shift-result is stored in shifter register 148 when the value of OP_C corresponds to a bitwise shift. Finally, product saturator 135 may be tested by inputting the test values for each product saturator test vector into shifter register 148 and verifying that the expected saturated product is stored in operation result register 114 when the value of OP_C corresponds to a MULTS operation.

Other attributes that enhance the testability and analyzability to ALU 100 include the use of shared elements between operations. For example, adder 130 is used for both addition operations (e.g., ADD and ADDS) and multiplication (e.g., MULT and MULTS) operations. As a result, testing adder 130 using the methods described above provides testing coverage the sum of OP_1 and OP_2 of adder 130 and for the intermediate sums that are generated during multiplication operations. Similarly, testing shifter 134 using the shifter test vectors provides testing coverage for all of the shifts (e.g., LSL, LSR, ASR, etc.) as well as for the generation of a scaled product.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for testing a functional unit within an arithmetic logic unit (ALU) of a flight control system, the functional unit having a predetermined structural implementation and configured to generate a result based on at least one data input, the method comprising:
 generating a plurality of test vectors based on the predetermined structural implementation of the functional unit, each test vector comprising a test value for each data input to the functional unit and an expected result value; and
 for each one of the plurality of test vectors:
  providing each test value to the functional unit; and
  verifying that the expected result value is generated by the functional unit.

2. The method of claim 1, wherein the step of generating the plurality of test vectors further comprises generating a plurality of test vectors to fully test and analyze the functional unit.

3. The method of claim 2, wherein:
 the ALU further comprises a first register for storing a first operand, a second register for storing a second operand, and a third register for storing a sum of the first operand and the second operand;
 the functional unit comprises an adder coupled to the first, second, and third registers, and configured to generate a sum of the first operand and the second operand, the sum being stored in the third register;
 the step of generating further comprises generating a plurality of adder test vectors, each comprising a first test value, a second test value, and an expected sum; and
 for each one of the plurality of adder test vectors:

the step of providing further comprises providing the first test value and the second test value to the first register and the second register, respectively; and the step of verifying further comprises verifying that the expected sum is stored in the third register.

4. The method of claim 2, wherein:

the ALU further comprises a first register for storing a first operand, a second register for storing a second operand, and a third register for storing a saturated sum;

the functional unit comprises a sum saturator coupled to the first, second, and third registers and configured to generate a saturated sum of the first operand and the second operand, the saturated sum being stored in the third register;

the step of generating further comprises generating a plurality of sum saturator test vectors, each comprising a first test value, a second test value, and an expected saturated sum; and for each one of the plurality of sum saturator test vectors:
the step of providing further comprises providing the first test value and the second test value to the first register and the second register, respectively; and
the step of verifying further comprises verifying that the expected saturated sum is stored in the third register.

5. The method of claim 2, wherein:

the ALU further comprises a first register for storing a first operand, a second register for storing a second operand, and a third register for storing a product of the first operand and the second operand;

the functional unit comprises a multiplier coupled to the first, second, and third registers and configured to generate a product of the first operand and the second operand, the product being stored in the third register;

the step of generating further comprises generating a plurality of multiplier test vectors, each comprising a first test value, a second test value, and an expected product; and for each one of the plurality of multiplier test vectors:
the step of providing further comprises providing the first test value and the second test value to the first register and the second register, respectively; and
the step of verifying further comprises verifying that the expected product is stored in the third register.

6. The method of claim 2, wherein:

the ALU further comprises a first register for storing a first operand, a second register for storing a second operand, and a third register for storing a shift-result;

the functional unit comprises a shifter coupled to the first, second, and third operands and configured to generate a shift-result based on the first operand and the second operand, the shift-result being stored in the third register;

the step of generating further comprises generating a plurality of shifter test vectors, each comprising a first test value, a second test value, and an expected shift-result; and for each one of the plurality of shifter test vectors:
the step of providing further comprises providing the first test value and the second test value to the first register and the second register, respectively; and
the step of verifying further comprises verifying that the expected shift-result is stored in the third register.

7. The method of claim 2, wherein:

the ALU further comprises a first register for storing a scaled product and a second register for storing a saturated product;

the functional unit comprises a product saturator coupled to the first and second registers and configured to generate a saturated product based on the scaled product, the saturated product being stored in the second register;

the step of generating further comprises generating a plurality of product saturator test vectors, each comprising a test value and an expected saturated product; and for each one of the plurality of product saturator test vectors:
the step of providing further comprises providing the test value to the first register; and
the step of verifying further comprises verifying that the expected saturated product is stored in the second register.

* * * * *